(12) United States Patent
Katoh et al.

(10) Patent No.: US 8,447,452 B2
(45) Date of Patent: May 21, 2013

(54) VEHICLE-USE ELECTRICITY MANAGEMENT SYSTEM, VEHICLE-USE ELECTRICITY INFORMATION MANAGEMENT APPARATUS AND VEHICLE-USE ELECTRICAL LOAD

(75) Inventors: Kunio Katoh, Nagoya (JP); Masahiro Goto, Okazaki (JP); Yasushi Hasegawa, Nagoya (JP)

(73) Assignee: Denso Corporation, Kariya (JP)

( * ) Notice: Subject to any disclaimer, the term of this patent is extended or adjusted under 35 U.S.C. 154(b) by 48 days.

(21) Appl. No.: 13/191,557

(22) Filed: Jul. 27, 2011

(65) Prior Publication Data

US 2012/0029747 A1 Feb. 2, 2012

(30) Foreign Application Priority Data

Jul. 27, 2010 (JP) ................................. 2010-168374
Mar. 30, 2011 (JP) ................................. 2011-075408

(51) Int. Cl.
*B60L 9/00* (2006.01)

(52) U.S. Cl.
USPC .......................................................... 701/22

(58) Field of Classification Search
USPC .................................................... 701/22, 36
See application file for complete search history.

(56) References Cited

U.S. PATENT DOCUMENTS

| 5,845,221 | A  | * | 12/1998 | Hosokawa et al. | ............. 701/36 |
| 5,991,669 | A  |   | 11/1999 | Dominke et al. | |
| 7,664,577 | B2 | * | 2/2010  | Yamamoto et al. | ........... 700/287 |
| 2002/0113441 | A1 |   | 8/2002 | Obayashi | |
| 2003/0018933 | A1 |   | 1/2003 | Yamamoto | |
| 2004/0124703 | A1 | * | 7/2004 | Tani et al. | ..................... 307/10.1 |
| 2004/0164616 | A1 |   | 8/2004 | Obayashi et al. | |
| 2006/0122737 | A1 | * | 6/2006 | Tani et al. | ..................... 700/286 |
| 2007/0198132 | A1 | * | 8/2007 | Yamamoto et al. | ........... 700/286 |
| 2008/0221755 | A1 | * | 9/2008 | Senda et al. | .................... 701/36 |

FOREIGN PATENT DOCUMENTS

| JP | 09-019055 | 1/1997 |
| JP | 10-250416 | 9/1998 |
| JP | 2002-199505 | 7/2002 |
| JP | 2003-016400 | 1/2003 |
| JP | 2004-194495 | 7/2004 |
| JP | 2004-260908 | 9/2004 |
| JP | 2007-237792 | 9/2007 |
| JP | 2008-279829 | 11/2008 |

* cited by examiner

*Primary Examiner* — James Trammell
*Assistant Examiner* — Michael D Lang
(74) *Attorney, Agent, or Firm* — Harness, Dickey & Pierce, PLC

(57) ABSTRACT

The vehicle-use electricity management system includes an electricity demand detection means to detect electricity consumed by electrical loads, and an electricity price information generation means to generate electricity price information indicative of a price of electricity supplied to the electrical loads based on the electricity demand. At least one of the electrical loads includes an electricity consumption ability determination means to determine whether electricity supplied to the own electrical load can be consumed unconditionally based on comparison between the electricity price information received from the electricity price information generation means and electricity consumption ability information stored in the own electrical load, and an electricity consumption control means to control an amount of electricity consumed by the own electrical load based on a determination result made by the electricity consumption ability determination means.

17 Claims, 11 Drawing Sheets

CONVENTIONAL VEHICLE

FIG. 3A
ELECTRICITY PRICE RATE TABLE
BATTERY CONDITION: GOOD

| CONDITION ON SUPPLYING SIDE (ELECTRICITY COST, GENERATION COST) | CONDITION ON CONSUMING SIDE (ELECTRICITY CONSUMPTION) | | |
|---|---|---|---|
| | LOW | MEDIUM | HIGH |
| INEXPENSIVE (DURING DECELERATION) | L | L | L |
| MEDIUM (DURING CRUISING) | L | L | M |
| EXPENSIVE (DURING ACCELERATION) | L (ex. $3) | M (ex. $5) | H (ex. $10) |

FIG. 3B
ELECTRICITY PRICE RATE TABLE
BATTERY CONDITION: DETERIORATED

| CONDITION ON SUPPLYING SIDE (ELECTRICITY COST, GENERATION COST) | CONDITION ON CONSUMING SIDE (ELECTRICITY CONSUMPTION) | | |
|---|---|---|---|
| | LOW | MEDIUM | HIGH |
| INEXPENSIVE (DURING DECELERATION) | L | M | M |
| MEDIUM (DURING CRUISING) | M | M | M |
| EXPENSIVE (DURING ACCELERATION) | M | M | H |

FIG. 4A

USER SET INFORMATION: ON

| LOAD TYPE | ELECTRICITY PURCHASING ABILITY | ELECTRICITY PRICE RATE | | |
|---|---|---|---|---|
| | | L ($3) | M ($5) | H ($10) |
| SAFETY-RELATED OR POWER TRAIN-RELATED LOAD | (HIGH: $10) | PURCHASABLE WITHOUT RESTRICTION | ↓ | ↓ |
| BODY-RELATED LOAD | (MEDIUM: $5) | ← | ↓ | PURCHASE RESTRICTION |
| HEAT-RELATED LOAD | (LOW: $3) | ← | PURCHASE RESTRICTION | ↓ |

FIG. 4B

USER SET INFORMATION: OFF

| LOAD TYPE | ELECTRICITY PURCHASING ABILITY | ELECTRICITY PRICE RATE | | |
|---|---|---|---|---|
| | | L ($3) | M ($5) | H ($10) |
| SAFETY-RELATED OR POWER TRAIN-RELATED LOAD | (HIGH: $10) | PURCHASABLE WITHOUT RESTRICTION | ↓ | ↓ |
| BODY-RELATED LOAD | (HIGH: $10) | ← | ↓ | ↓ |
| HEAT-RELATED LOAD | (HIGH: $10) | ← | ↓ | ↓ |

FIG. 9

ELECTRICITY PRICE RATE TABLE

| BATTERY CHARGE STATE (SOC) | CONDITION ON SUPPLYING SIDE (ELECTRICITY COST) | CONDITION ON CONSUMING SIDE (ELECTRICITY CONSUMPTION) | | |
|---|---|---|---|---|
| | | LOW | MEDIUM | HIGH |
| EXCESSIVE | INEXPENSIVE (DURING DECELERATION) | L | L | L |
| | MEDIUM (DURING CRUISING) | L | L | L |
| | EXPENSIVE (DURING ACCELERATION) | L | L | L |
| GOOD | INEXPENSIVE (DURING DECELERATION) | L | L | L |
| | MEDIUM (DURING CRUISING) | L | L | M |
| | EXPENSIVE (DURING ACCELERATION) | L (ex. $3) | M (ex. $5) | H (ex. $10) |
| NORMAL | INEXPENSIVE (DURING DECELERATION) | L | L | M |
| | MEDIUM (DURING CRUISING) | L | M | M |
| | EXPENSIVE (DURING ACCELERATION) | M | M | H |
| LOW | INEXPENSIVE (DURING DECELERATION) | L | M | M |
| | MEDIUM (DURING CRUISING) | M | M | H |
| | EXPENSIVE (DURING ACCELERATION) | M | H | H |
| URGENT | INEXPENSIVE (DURING DECELERATION) | H | H | H |
| | MEDIUM (DURING CRUISING) | H | H | H |
| | EXPENSIVE (DURING ACCELERATION) | H | H | H |

VEHICLE-USE ELECTRICITY MANAGEMENT SYSTEM, VEHICLE-USE ELECTRICITY INFORMATION MANAGEMENT APPARATUS AND VEHICLE-USE ELECTRICAL LOAD

This application claims priority to Japanese Patent Applications No. 2010-168374 filed on Jul. 27, 2010, and No. 2011-75408 filed on Mar. 30, 2011, the entire contents of which are hereby incorporated by reference.

BACKGROUND OF THE INVENTION

1. Field of the Invention

The present invention relates to a vehicle-use electricity management system for managing electricity used to drive an electrical load mounted on a vehicle, a vehicle-use electricity information management apparatus for use in the vehicle-use electricity management system, and a vehicle-use electrical load.

2. Description of Related Art

Types and electricity consumption of electrical loads mounted on a vehicle (may be referred to simply as load(s) hereinafter) are steadily increasing. Accordingly, it is required to reduce overall electricity consumption and to increase energy usage efficiency of a vehicle (reduction of $CO_2$ discharge, for example). To this end, various techniques to properly manage supply-demand relationship of electricity for a vehicle are proposed.

Such techniques includes one which optimally distributes electricity generated by an alternator among a plurality of electrical loads, as described in Japanese Patent Application Laid-open No. 2004-194495, for example. The technique described in this patent document operates such that an electricity supply control means sets (changes) priorities and electricity demand of electrical loads mounted on a vehicle depending on temporal changes of a vehicle state and states of the electrical loads, and a load control means controls distribution of electricity among the electrical loads, and electricity consumptions of the electrical loads in accordance with the settings made by the electricity supply control means.

However, to implement the technique described in the above patent document, a large space to accommodate various components has to be provided and a high cost to provide the various components has to be accepted, because the technique needs a structure to selectively make or break electricity supply paths or electricity distribution paths leading to the electrical loads.

Further, distribution of electricity and making or breaking of electricity supply paths are controlled mostly by the electricity supply control means. That is, electricity supply to the respective electrical loads are put under centralized control of the electricity supply control means.

Accordingly, to mount the electricity supply control means implemented as a product on a vehicle, it is necessary to build or design an electricity management system including the electricity supply control means taking into account usage conditions (important particulars and design philosophy, for example) and behaviors (operating specifications and design specifications, for example) of the electrical loads, and also reactions occurring when electricity supply to the electrical loads is interrupted.

That is, to implement the electricity supply control means as a product, extensive technological knowledge and enormous man-hours regarding the whole system including both the electricity supplying side and the electricity consuming side are needed. Hence, it is difficult to implement such an electricity supply control means as a product because of burden of ensuring a necessary quality and reducing a developing cost. Particularly, for recent vehicles highly systemized such that a plurality of electrical loads operate in cooperation with one another to carry out one function, it is very difficult to implement an electricity management system capable of performing electricity management appropriately taking into account of such conditions and reactions of all the electrical loads.

Further, in each of the electrical loads, permission of receiving electricity to itself, and accordingly permission of starting operation of itself follows instructions received from outside (for example, instructions received from the electricity supply control means). Accordingly, each electrical load has to be designed to accept unexpected interruption of supply of electricity.

That is, persons in charge of designing or developing electrical loads have a burden to provide the electrical loads with capability of following instructions received from outside while ensuring the same safety level and function level as those of conventional electrical loads. By the reasons described above, the persons in charge of designing or developing electrical loads are reluctant to adopt the technique as described in the foregoing patent document.

SUMMARY OF THE INVENTION

An embodiment provides a vehicle-use electricity management system for a vehicle having a plurality of electrical loads and an electricity supply means to supply electricity to the electrical loads, comprising:

an electricity demand detection means to detect electricity consumed by the electrical loads as electricity demand;

an electricity price information generation means to generate electricity price information indicative of a price of electricity supplied to the electrical loads as an electricity price based on the electricity demand detected by the electricity demand detection means;

wherein at least one of the electrical loads includes an electricity consumption ability determination means to determine whether electricity supplied from the electricity supply means to the own electrical load can be consumed unconditionally based on comparison between the electricity price information received from the electricity price information generating means and electricity consumption ability information stored in the own electrical load, and an electricity consumption control means to control an amount of electricity consumed by the own electrical load based on a determination result made by the electricity consumption ability determination means.

Another embodiment provides a vehicle-use electricity information management apparatus mounted on a vehicle having a plurality of electrical loads and an electricity supply means to manage electricity supplied from the electricity supply means to the electrical loads, comprising:

an electricity price information generation means to generate electricity price information indicative of a price of electricity supplied from the electricity supply means to the electrical loads based on an electricity demand of the electrical loads; and an output means to output the electricity price information generated by the electricity price information generating means to at least one of the electrical loads.

Another embodiment provides a vehicle-use electrical load mounted on a vehicle and configured to operate on electricity supplied from an electricity supply means mounted on the vehicle, comprising:

an electricity consumption determination means to determine whether the vehicle-use electrical load can consume electricity supplied form the electricity supply means unconditionally based on comparison between electricity price information received from the electricity supply means and electricity consumption ability information set in the vehicle-use electrical load, the electricity price information indicating a price of electricity supplied from the electricity supply means, the electricity consumption ability information indicating a level of ability to consume electricity supplied from the electricity supply mean; and electricity consumption control means to control an amount of electricity consumed by the vehicle-use electrical load in accordance with a determination result by the electricity consumption determination means.

According to the present invention, it is possible to properly manage supply-demand relationship of electricity in a vehicle without incurring a high cost.

Other advantages and features of the invention will become apparent from the following description including the drawings and claims.

BRIEF DESCRIPTION OF THE DRAWINGS

In the accompanying drawings:

FIGS. 3A and 3B are diagrams each showing an electricity price rate table stored in an electricity manager included in the electricity management system shown in FIG. 1;

FIGS. 4A and 4B are tables each showing a relationship among the electricity price, electricity purchasing ability and restriction of purchase for each load type;

FIG. 9 is a diagram showing an electricity price rate table stored in an electricity manager included in the electricity management system according to the third embodiment of the invention;

PREFERRED EMBODIMENTS OF THE INVENTION

First Embodiment

Figure 1:
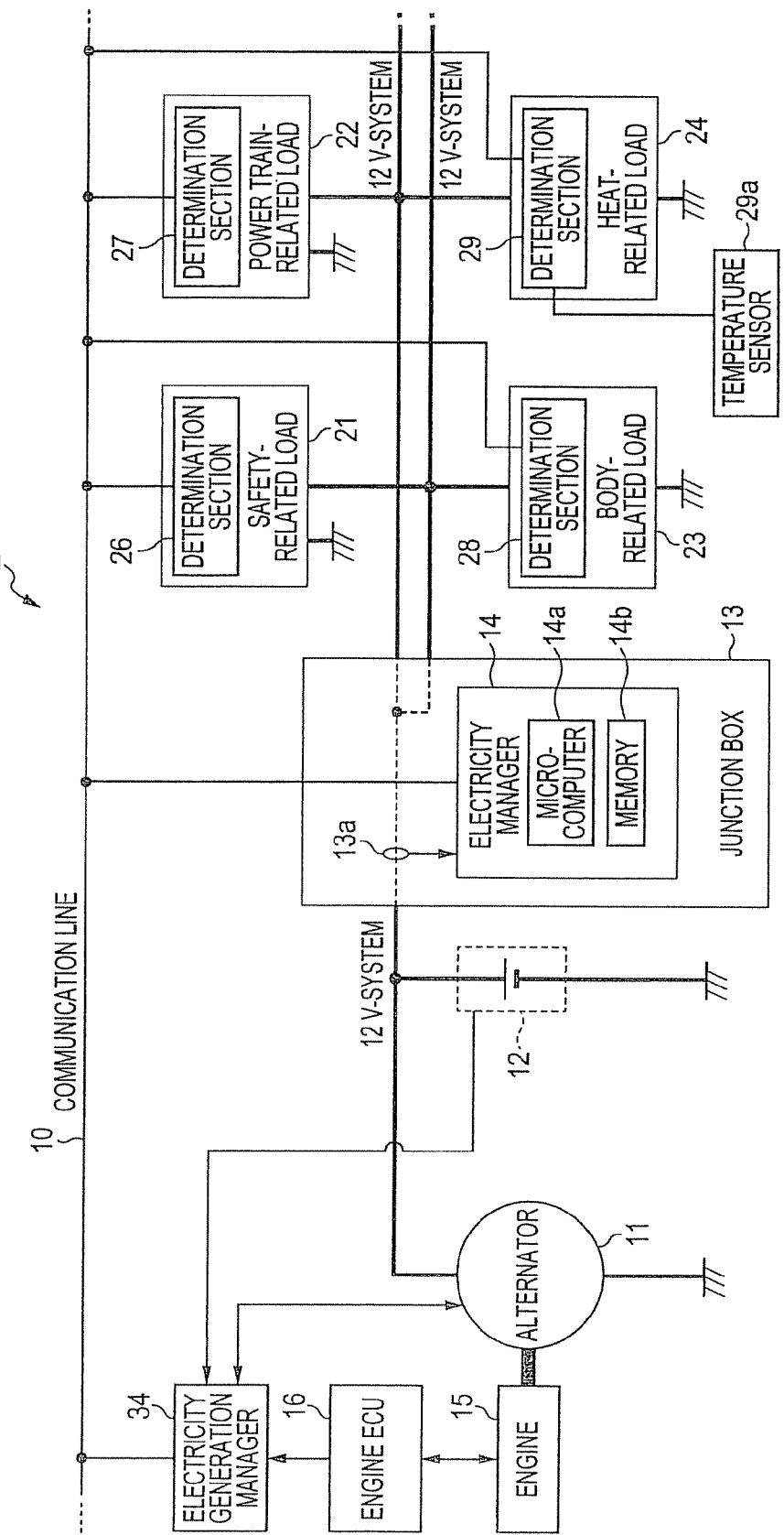
FIG. 1 is a diagram showing the overall structure of an electricity management system according to a first embodiment of the invention.

FIG. 1 is a diagram showing the overall structure of an electricity management system 1 according to a first embodiment of the invention. The electricity management system 1 is mounted on a vehicle with an internal combustion engine 15 such as a gasoline engine or a diesel engine as a traction power source (referred to as "conventional vehicle" hereinafter) to manage electricity supplied to a plurality of loads.

The electricity management system 1 includes an alternator 11 driven by an engine 15 to generate electricity, a battery 12 to store electricity generated by the alternator 11, a plurality of loads 21, 22, 23 and 24 which operate on electricity generated by the alternator 11 or stored in the battery 12, a junction box 13 to distribute electricity generated by the alternator 11 or stored in the battery 12 to the loads 21, 22, 23, and 24, and an electricity manager 14 disposed in the junction box 13 to generate information regarding electricity supplied to the respective loads 21, 22, 23 and 24, and transmit this information to the loads 21, 22, 23 and 24.

The engine 15 is controlled by an engine ECU 16. The engine ECU 16 has a function of measuring an amount of fuel consumed by the engine 15, and outputs the measurement result to an electricity generation manager 17.

The basic function of the electricity generation manager 17 is to control charging of the battery 12 by the alternator 11. The electricity generation manager 17 monitors the SOC (State Of Charge) and SOH (State Of Health) of the battery 12. When the SOC is lowered, the electricity manager 17 causes the alternator 11 to operate to charge the battery 12.

Further, the electricity generation manager 17 periodically calculates an electricity generation cost indicative of a cost of generating electricity by the alternator 11. The calculated electricity generation cost is used as an electricity cost which indicates a cost of supplying electricity to the respective loads. In this embodiment, the electricity cost (which is equal to electricity generation cost in this embodiment) is represented by a fuel consumption amount per generation of unit electricity (g/h/kW or g/kWh).

When the vehicle is accelerating or idling, since the alternator 11 consumes fuel, the electricity cost is high. When the vehicle is decelerating, since the alternator 11 generates electricity using braking energy while consuming very little amount of fuel, the electricity cost is low. When the vehicle is cruising, a fuel consumption amount is at midway between that when the vehicle is accelerating and that when the vehicle is decelerating, the electricity cost is medium.

The electricity generation manager 17 outputs the calculated electric cost to the electricity manager 14 through a communication line 10. In addition, the electricity generation manager 17 monitors the SOC and SOH of the battery 12, and outputs information showing the monitored results to the electricity manager 14 through a communication line 10.

Incidentally, the electricity generation manager 17 is disposed separately from the engine ECU 16 in this embodiment, the electricity generation manager 17 may be incorporated in the engine ECU 16. The electricity generation manager 17 may be implemented by software or by hardware including logic circuits.

The battery 12, which is for storing electricity of DC 12 V, supplies electricity to the loads 21, 22, 23 and 24 when the alternator 11 is not in operation. The battery 12 is charged under control of the electricity generation manager 17 so that its SOC is kept at a predetermined level.

The loads 21, 22, 23 and 24 are vehicle accessories mounted on the vehicle, which operate on electricity of DC 12 V supplied from the battery 12. There are many vehicle accessories on board the vehicle. However, in this embodiment, only the four loads 21, 22, 23 and 24 of different kinds are shown in the drawings to facilitate explanation. More specifically, the load 21 is a safety-related accessory, the load 22 is a power train-related accessory, the load 23 is a body-related accessory, and the load 24 is a heat-related accessory.

The safety-related accessory may be one including a brake ECU, or may be an electric steering device. The power train-related accessory may be one including an engine ECU which controls the power train of the vehicle. The body-related accessory may be one including a door ECU, or may be a power window device, or a meter ECU. The heat-related accessory may be an air conditioning device.

The heat-related load 24 includes a temperature sensor 29a to measure the outside air temperature. The loads 21, 22, 23 and 24 include determination sections 26, 27, 28 and 29, respectively. The measurement result of the temperature sensor 29a is inputted to the determination section 29 of the heat-related load 24. Each of the determination sections 26, 27, 28 and 29 determines whether to switch to the electricity save mode based on an electricity price transmitted from the electricity manager 14 through the communication line 10 and a power purchasing ability set in itself. As described later, the measured outside air temperature is used a's a function priority determining factor to make a determination whether the electricity purchasing ability should be changed.

Figure 2:
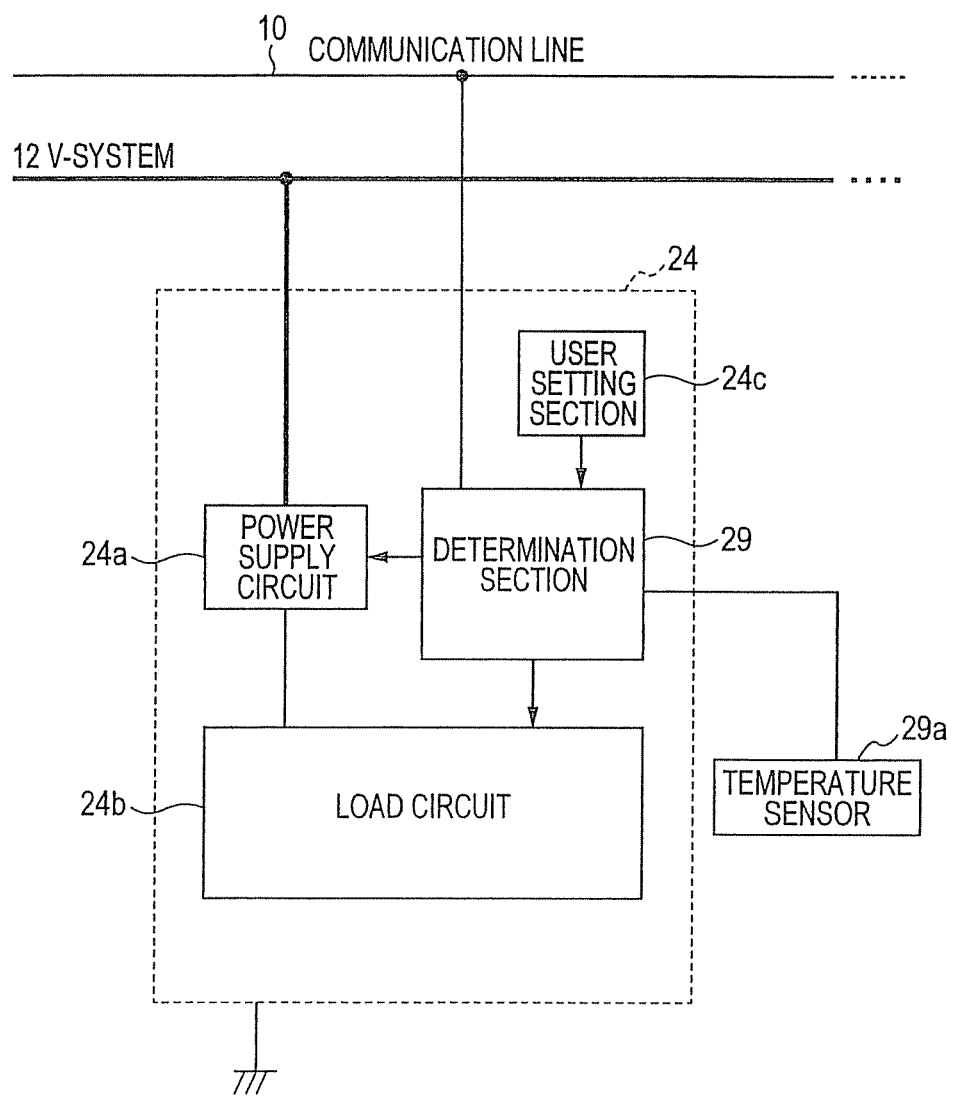
FIG. 2 is a diagram showing the structure of a heat-related load included in the electricity management system shown in FIG. 1.

Next, the structures of the loads 21, 22, 23 and 24 are explained in more detail with reference to FIG. 2. FIG. 2 shows the structure of the heat-related load 24 as a typification of these loads. As shown in FIG. 2, the heat-related load 24 includes, in addition to the determination section, a power supply circuit 24a which generates an operating voltage from electricity of DC 12 V, a load circuit 24b which operates on the operating voltage supplied from the power supply circuit 24a, and a user setting section 24c which allows the user of the vehicle to make permission or inhibition of switch to the electricity save mode.

The power supply circuit 24a and the determination section 29 consumes some amount of electricity for their own operations. However, most of electricity supplied to the heat-related load 24 is consumed by the load circuit 24b.

The determination section 29 compares the received electricity cost with its electricity purchasing ability, and if the electricity cost is higher than the electricity purchasing ability, causes the heat-related load 24 to switch to the electricity save mode where the electricity consumption of the heat-related load 24 is reduced or operation of the heat-related load 24 is stopped, by issuing a command to at least one of the power supply circuit 24a and the load circuit 24b.

However, the heat-related load 24 may operate consuming a normal amount of electricity without switching to the electricity save mode, depending on user-set information inputted through the user setting section 24c. In this embodiment, when the user-set information is turned on, the heat-related load 24 is allowed to switch to the electricity save mode, and when the user-set information is turned off, the heat-related load 24 is inhibited from switching to the electricity save mode.

The determination section 29 may be implemented by software or by hardware including logic circuits. Like the heat-related load 24, each of the other loads 21, 22 and 23 includes an electricity supply circuit and a user setting section, and is capable of switching to the electricity save mode to reduce electricity consumption depending on the user-set information.

The junction box 13 has a relay/distribution function to distribute electricity supplied from the alternator 11 and the battery 12 among the loads 21, 22, 23 and 24. In this embodiment, electricity of DC 12 V is supplied to the loads 21, 22, 23 and 24 through separate two power lines.

The electricity manager 14 disposed in the junction box 13 is for managing electricity supplied to the loads 21, 22, 23 and 24. In this embodiment, the electricity manager 14 does not actively control supply of electricity to the loads 21, 22, 23 and 24, but generates electricity information showing an electricity price indicative of price of electricity supplied, and outputs the generated electricity information to the loads 21, 22, 23 and 24.

The electricity manager 14 includes a microcomputer 14a and a memory 14b, and performs a later-described electricity price calculation/output process in accordance with a program stored in the memory 14b.

The electricity price, which represents the present price of electricity being supplied is determined based on balancing between the condition on the electricity consuming side (electricity consumption amount) and the condition on the electricity supplying side (electricity generation cost or electricity cost).

The electricity price and the electricity cost correlate with each other. The electricity price increases with the increase of the electricity cost, and decreases with the decrease of the electricity cost. As described in the foregoing, the electricity manager 14 periodically receives the electricity cost (electricity generation cost) from the electricity generation manager 17. The electricity manager 14 sets the electricity price to a higher value when the received electricity cost is higher, and to a lower value when the received electricity is lower.

In this embodiment, the electricity manager 14 is configured to measure electricity supplied to the respective loads 21, 22, 23 and 24, that is, electricity supplied to the whole of the vehicle accessories, so that the electricity price reflects the measured electric power. More specifically, a current sensor 13a is disposed in the junction box 13 to measure the total electricity supplied from the alternator 11 and the battery 12, and the output signal of the current sensor 13a is inputted to the electricity manager 14.

The output signal of the current sensor 13a indicates a consumed current. The electricity manager 14 can calculate a consumed electricity from the consumed current, because the rated output voltage of the battery 12 is 12 V. Instead of the current sensor 13a, a wattmeter may be used.

The acquired electricity consumption reflects generation of the electricity price. For example, when the electricity consumption is large (that is, when the electricity demand is high), the electricity price is high, and when the electricity consumption is small (that is, when the electricity demand is low), the electricity price is low. That is, the electricity price is calculated at a higher value with increase of the electricity consumption (electricity demand).

In this embodiment, the electricity price is determined based on, in addition to the conditions on the power supplying side and the electricity consuming side, the condition on the electricity storage side (that is, the condition of the battery 12). As described in the foregoing, the electricity generation manager 17 transmits information showing the state of the battery 12 (that is, the SOC and SOH) to the electricity manager 14 through the communication line 10.

This information transmitted from the power generation manager 17 is reflected in the electricity price calculated by the electricity manager 14. For example, when both the SOC and SOH are low, the electricity price is set to a high value on the assumption that the battery 12 is unhealthy or deteriorated. On the contrary, when both the SOC and SOH are high, the electricity price is set to a low value on the assumption that the battery 12 is healthy or in good condition.

This embodiment may be modified such that only one of the SOC and SOH is reflected in the electricity price. In the case of only the SOC being reflected in the electricity price, the electricity price is set to a low value when the SOC is high on the assumption that electricity dischargeable from the battery 12 is abundant, and necessity to cause the alternator 11 to operate is low, and set to a high value when the SOC is low on the assumption that the battery 12 is overdischrged, and necessity to cause the alternator 11 to operate is high. That is, the electricity price is increased with the decrease of the SOC (that is, with the decrease of the remaining capacity of the battery 12), or with the decrease of the SOH (that is, with the progress of deterioration of the battery 12).

In this embodiment, the electricity manager 14 receives the battery state information (SOC and SOH) from the electricity generation manager 17. However, the electricity manager 14 may be configured to monitor the battery 12 by itself to detect the SOC and SOH of the battery 12.

As described above, according to this embodiment, the electricity price is calculated based on, in addition to the condition of the supplying side (electricity generation cost) and the condition of the consuming side (electricity consumption demand), the condition of the storage side (condition of the battery 12).

Calculation of the electricity price is performed using an electricity price rate table or map stored in the memory 14b. FIGS. 3A and 3B show examples of the electricity price rate table. In this embodiment, the electricity price rate table shown in FIG. 3A is used when the battery 12 is in good condition, and the electricity price rate table shown in FIG. 3B is used when the battery 12 is deteriorated.

As shown in FIGS. 3A and 3B, the electricity rate is set to one of three levels of "H" (high level: $10, for example), "M" (middle level: $5, for example) and "L" (low level: $3, for example), depending on the electricity cost and electricity consumption amount.

For example, when the battery 12 is in good condition, if the electricity cost (power generation cost) received from the power generation manager 17 is high, and electricity consumption of the whole of the vehicle accessories is high, the electricity price is set to "H". When the battery 12 is in good condition, if the electricity cost (electricity generation cost) received from the electricity generation manager 17 is high, and electricity consumption of the whole of the vehicle accessories is low, the electricity price is set to "L". When the battery 12 is deteriorated, if the electricity cost received from the electricity generation manager 17 is high, and electricity consumption of the whole of the vehicle accessories is low, the electricity cost is set to "M". As exemplified above, the electricity price is set higher if the battery 12 is deteriorated than if the battery 12 is in good condition for the same values of the electricity cost and electricity consumption.

Incidentally, the unit "$" and values of the electricity price shown in FIGS. 3A and 3B are just example. As explained above, the electricity manager 14 calculates the electricity price based on the conditions on the electricity supplying side, electricity consuming side and electricity storage side, while referring to the electricity price rate tables shown in FIGS. 3A and 3B. The calculation of the electricity price is periodically performed based on the latest conditions of the vehicle. Each time the electricity price is calculated, it is transmitted to the loads 21, 22, 23 and 24 through the communication line 10.

Each of the loads 21, 22, 23 and 24 determines whether to switch to the electricity save mode based on the electricity price transmitted from the electricity manager 14. When a determination to switch to the electricity save mode is made when the user-set information is set on, a switch to the electricity save mode is carried out.

Electricity purchasing ability is set in each of the loads 21, 22, 23 and 24 in advance. More precisely, electricity purchasing ability is preset in the determination section of each of the loads 21, 22, 23 and 24. The electricity purchasing ability is used as a criterion for determining whether it is possible to consume electricity supplied from the alternator 11 and the battery 12 unconditionally (that is, without switching to the electricity save mode) based on the electricity price (price of the supplied electricity). In this embodiment, the unit of the electricity purchasing ability is the same as that of the electricity price.

The electricity purchasing ability is set to a higher value for the loads having a higher priority (the safety-related load 21 and power train-related load 22, for example), and set to a lower value for the loads which can be temporarily stopped with no concern of substantial trouble (the heat-related load 24 and body-related load 23, for example).

However, it should be understood that the electricity purchasing ability is set in accordance with the priority only while the user-set information is set on, that is, only while switching to the electricity save mode is permitted. More specifically, while the user-set information is set on, as shown in FIG. 4A, the electricity purchasing ability is set to a highest value ($10, for example) for the safety-related load 21 and the power train-related load 22, and to a lowest value ($3, for example) for the heat-related load 24, and to a medium value ($5, for example) for the body-related load 23.

On the other hand, while the user set information is set off, that is, while switching to the electricity save mode is inhibited, the electricity purchasing ability is set to the highest value ($10, for example) for all the loads.

Each of the loads switches to the electricity save mode upon detecting that the electricity price periodically received is higher than the electricity purchasing ability set in itself, and otherwise, continues to operate in the normal mode. FIG. 4A is a table showing a relationship among the electricity price, the electricity purchasing ability and restriction of purchase for each of the loads while the user-set information is set on. FIG. 4B is a table showing a relationship among the electricity price, electricity purchasing ability and restriction of purchase while the user-set information is set off. According to these settings, when the electricity price is "M" ($5), for example, the safety-related load 21 can purchase electricity, because the electricity purchasing ability is set to the highest value of $10 for the safety-related load 21. Here, the phrase "can purchase electricity" means "can consume supplied electricity unconditionally".

On the other hand, the heat-related load 24 whose electricity purchasing ability is low is imposed with a purchase restriction, and is encouraged to change its electricity purchase behavior. Here, the phrase "change electricity purchase behavior" means "switch to the electricity save mode". However, this is just an example. Changing electricity purchase behavior may be other than switching to the electricity save mode, for example, it may completely stop consuming electricity.

It is also possible to configure each load not to change its electricity purchase behavior (that is, to continue to operate in the normal mode) when imposed with the electricity purchase restriction. That is, the loads 21, 22, 23 and 24 may be configured to determine by themselves whether to switch to the electricity save mode, and how to operate in the electricity save mode independently from commands received from the outside.

Incidentally, when the user-set information is set off, since switching to the electricity save mode is not permitted, and accordingly, the electricity purchasing ability is set to the highest value ($10) for all of the loads, all the loads can purchase electricity unconditionally irrespective of the value of the electricity price received from the electricity manager 14 as shown in FIG. 4B.

Figure 5:
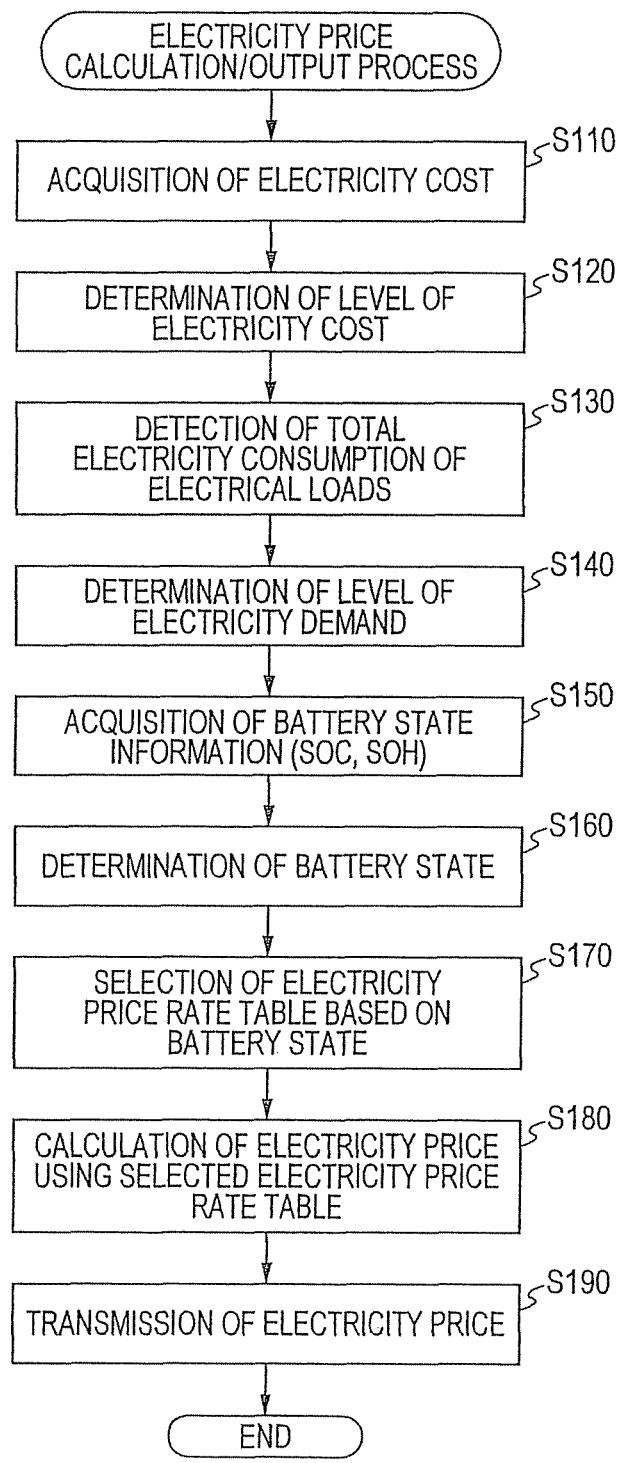
FIG. 5 is a flowchart showing an electricity price calculation/output process performed by the electricity manager included in the electricity management system shown in FIG. 1.

Next, an electricity price calculation/output process performed at regular time intervals by the electricity manager 14 (more precisely, by the microcomputer 14a) is explained with reference to the flowchart of FIG. 5. This process begins in step S110 where the microcomputer 14a receives the electricity cost (electricity generation cost) transmitted from the electricity generation manager 17. In subsequent step S120, a determination α is made to detect the level of the received electricity cost. More specifically, it is detected whether the received electricity cost is expensive, inexpensive, or medium (see FIG. 3).

In subsequent step S130, an amount of electricity consumed by the loads 21, 22, 23 and 24, that is, the total electricity consumption of all the vehicle accessories is detected as an electricity demand based on the measurement result of the current sensor 13a. In subsequent step S140, a determination 13 is made to determine the level of the electricity demand. More specifically, it is detected at which of "H" (high level), "L" (low level) and "M" (medium level) the electricity demand is.

In subsequent step S150, the battery information (SOC and SOH, for example) transmitted from the electricity generation manager 17 is acquired. In subsequent step S160, a determination γ is made to determine whether the battery 12 is healthy (in good condition) or unhealthy (deteriorated).

In subsequent step S170, one of the electricity price rate tables shown in FIG. 3A and FIG. 3B is selected in accordance with the result of the determination γ. In subsequent step S180, the electricity price is calculated based on the results of the determinations α and β using the selected electricity price rate table.

In subsequent step S190, the calculated electricity price is transmitted to the loads 21, 22, 23 and 24 through the communication line 10. Next, an electricity save mode switching determination process performed at regular time intervals respectively by the determination sections 26, 27, 28 and 29 of the loads 21, 22, 23 and 24 is explained with reference to the flowchart of FIG. 6.

This process begins in step S310 to receive the electricity price from the electricity manager 14 through the communication line 10. In subsequent step S320, the user-set information indicative of permission or inhibition of switching to the electricity save mode is acquired.

In subsequent step S330, the function priority determining factor is acquired. In this embodiment, step S330 is performed only by the determination section 29 of the heat-related load 24 to acquire the outside air temperature measured by the temperature sensor 29a.

In subsequent step S340, the electricity purchasing ability is calculated based on the user-set information acquired in step S320 (for all the loads) and the function priority determining factor acquired in step S330 (for only the heat-related load). More specifically, as explained in the foregoing with reference to FIG. 4A, the electricity purchasing ability is calculated as one of the highest value ($10), medium value ($5) and lowest value ($3) while the user set information is set on. While the user set information is set off, the electricity purchasing ability is calculated as the highest value ($10) for all of the loads as shown in FIG. 4B.

For the heat-related load 24, the default values of the electricity purchasing ability shown in FIGS. 4A and 4B are changed depending on the function priority determining factor. More specifically, when the outside air temperature measured by the temperature sensor 29a is within a predetermined temperature range, the default values of the electricity purchasing ability are unchanged. However, when the outside air temperature is above or below the predetermined temperature range, the electricity purchasing ability is increased for all of the default values by a certain value ($3, for example).

The above configuration makes it possible to avoid switching to the electricity save mode from being made when the default value is lower than the electricity price, depending on the outside air temperature. This makes it possible to cause the heat-related load 24 having a low priority to continue to operate in the normal mode as far as possible when it is so hot or cold that the outside air temperature is outside the predetermined temperature range.

Incidentally, such a configuration to increase (or reduce) the default values depending on the function priority determining factor may be applied to the loads other than the heat-related load 24 as necessary. In step S350 subsequent to step S340, it is determined whether or not the calculated electricity purchasing ability is higher than the acquired electricity price. If the determination result in step S350 is affirmative, the process proceeds to step S360 to set an electricity save mode switch flag. As a result, the relevant load switches to the electricity save mode. If the determination result in step S350 is negative, the process proceeds to step S370 to reset the electricity save mode switch flag. As a result, the relevant load switches to the normal mode.

In the electricity management system 1 of this embodiment, the electricity manager 14 does not positively control or dominate supply and distribution of electricity to the respective loads, but only periodically calculates the electricity price and transmits information showing the electricity price to the respective loads, and leaves the respective loads to determine how to consume electricity.

That is, the electricity management system 1 of this embodiment adopts the market price concept (market principles) to calculate the electricity price at a value appropriate in terms of both the condition on the electricity supplying side and the condition on the electricity consuming side. Each of the loads determines its behavior based on the calculated electricity price.

Hence, since the electricity management system 1 of this embodiment does not need a structure to make and break electricity supply paths or electricity distribution paths leading to the respective loads, the manufacturing cost can be reduced compared to conventional systems. Further, since the electricity manager 14 does not have a responsibility to stop supply of electricity to the respective loads, but instead, each of the loads saves electricity consumption by itself, the electricity manager 14 does not need to have extensive knowledge of the respective loads. That is, since the role and structure of the electricity manager 14 can be very limited, it can be manufactured at low cost with ease.

Further, since developers or designers can develop or design vehicle-mounted electrical loads with a large degree of flexibility making the most of their professional knowledge, vehicle-mounted electrical loads optimally designed and having excellent efficiencies can be provided. Further, according to this embodiment, it is possible to optimally perform electricity-save control for each of vehicle-mounted electrical loads without affecting the others.

Hence, according to this embodiment, it is possible to maintain the supply and demand of electricity of a vehicle in an appropriate state at low cost and with a simple structure. This can contribute to reduction of electricity consumption and improvement of energy usage efficiency (reduction of $CO_2$ discharge) of a vehicle.

Incidentally, when a shortage of electricity supply remains despite efforts on the electricity consuming side (loads) such as switching to the electricity save mode, there occurs reduction of the SOC of the battery 12 or reduction of the battery voltage. In this case, the electricity generation manager 17 detects the reduction of the SOC of the battery 12 or reduction of the battery voltage, and as a result, it causes the alternator 11 to start operation.

Second Embodiment

The above described first embodiment is an example in which the present invention is applied to a conventional vehicle. However, the present invention can be applied also to a hybrid vehicle having an internal combustion engine and an electric motor as traction power sources (referred to as "HV vehicle" hereinafter), and an electric vehicle having an electric motor as a sole traction power source (referred to as "EV vehicle" hereinafter).

Figure 7:
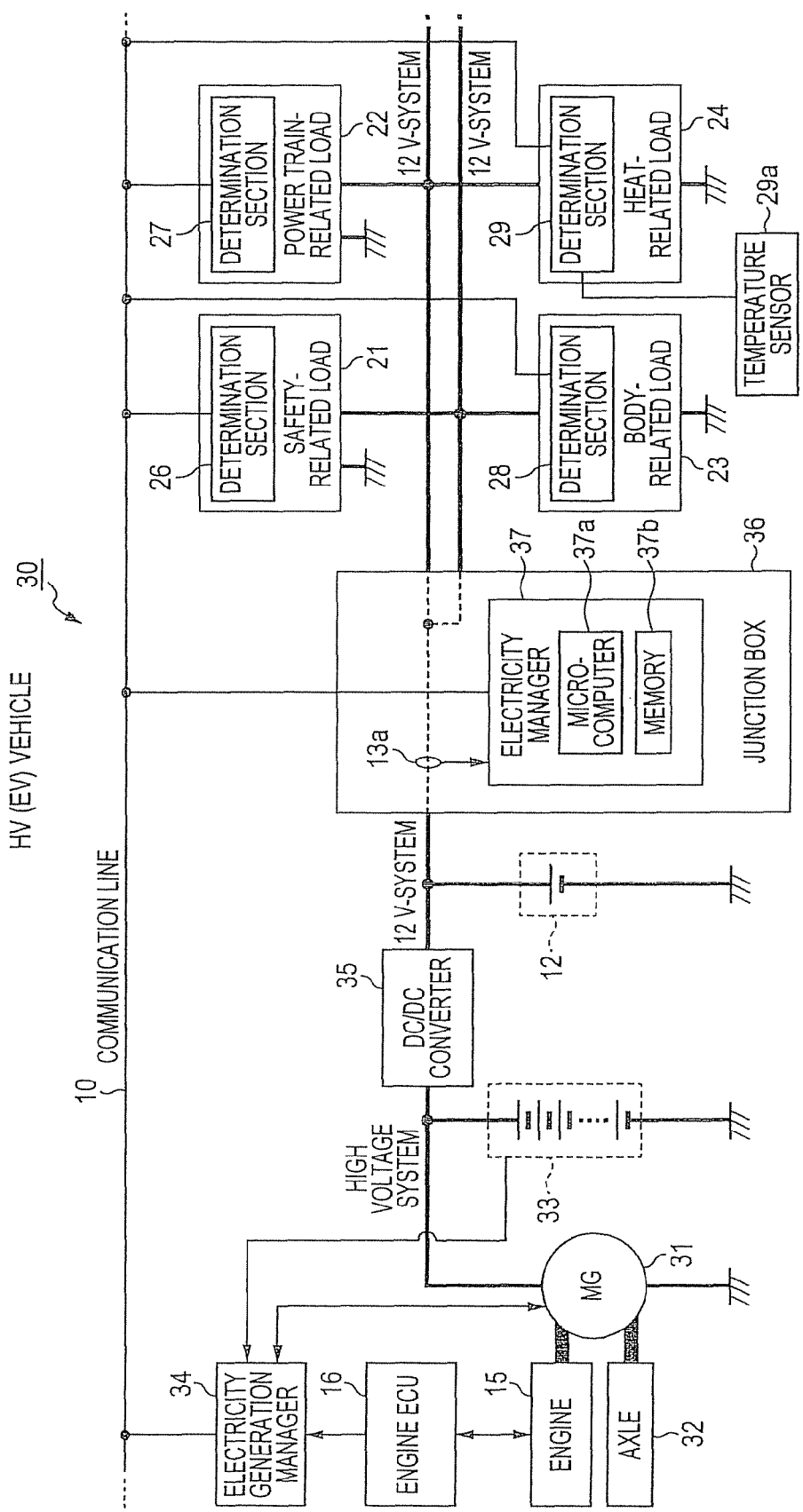
FIG. 7 is a diagram showing the overall structure of an electricity management system according to a second embodiment of the invention.

The following description of a second embodiment as an example in which the present invention is applied to a HV vehicle focuses differences with the first embodiment. FIG. 7 is a diagram showing the overall structure of an electricity management system 30 according to the second embodiment of the invention.

The HV vehicle on which the electricity management system 30 of this embodiment is mounted has an MG (Motor/Generator) 31 as a traction power source other than the engine 15. The MG 31 can be driven to rotate by electricity supplied from a high voltage battery 33, and accordingly the vehicle can run by traction power generated by the MG 31 only.

The MG 31 also serves as an electricity generating means capable of generating electricity by the driving force of the engine 15 and the torque of an axle 32 of the vehicle. When the vehicle is decelerating, the MG 31 generates electricity using regenerative energy, and this generated electricity is stored in the high voltage battery 33. The output voltage of the high voltage battery 33 (300 V, for example) is higher than that of the battery 12 in the first embodiment.

In the first embodiment, energy for generating the traction power is derived from fuel supplied to the engine 15. On the other hand, in the second embodiment, the energy for generating the traction power is derived from both fuel supplied to the engine 15 and electricity stored in the high voltage battery 33.

The basic function of an electricity generation manager 34 in this embodiment is to control charging of the high voltage battery 33 by the MG 31. To this end, the electricity generation manager 34 monitors the state (SOC and SOH, for example) of the high voltage battery 33, and causes the MG 31 to operate as necessary to charge the high voltage battery 33 depending on the monitored result when the vehicle is running by the driving force of the engine 15, or when regenerative braking is being applied to the vehicle.

Further, the electricity generation manager 34 periodically calculates an electricity cost as a cost of generating electricity by the MG 31, and transmits the calculated electricity cost to an electricity manager 37 disposed in a junction box 36 through the communication line 10. In this embodiment, the electricity cost is represented by a fuel consumption amount per generation of unit electricity (g/h/kW or g/kWh) like in the first embodiment.

Accordingly, when the vehicle is accelerating or idling, since a fuel consumption amount increases due to electricity generating operation of the MG 31, the electricity cost is high. On the other hand, when the vehicle is decelerating, since the MG 31 generates electricity using regenerative braking energy, and accordingly almost no fuel is consumed, the electricity cost is low. When the vehicle is cruising, a fuel consumption amount is at midway between that when the vehicle is accelerating and that when the vehicle is decelerating, the electricity cost is medium.

Incidentally, in the case of an EV vehicle, since no engine which consumes fuel is mounted, the electricity cost cannot be represented by a fuel consumption amount per generation of unit electricity. Accordingly, in the case of an EV vehicle, the electricity cost may be represented by a variation per unit time of electricity ($d \cdot kWh/dt \cdot Wh$) stored in the high voltage battery 33. Also in the case of an EV vehicle, the electricity cost can be calculated by the electricity generation manager 34.

Since the high voltage battery 33 can be assumed to be a vehicle traction power source, the electricity cost in the case of a HV vehicle may be calculated in the same way as in the case of an EV vehicle.

In the case of an HV vehicle or EV vehicle, since no alternator is mounted, the loads 21, 22, 23 and 24 are supplied with the output voltage of a DC/DC converter 35 which steps down the battery voltage of the high voltage battery 33 to 12 V. The output voltage of the DC/DC converter 35 is also applied to the battery 12 serving as an auxiliary battery, so that the respective loads are supplied with electricity also from the battery 12.

The electricity manager 37 disposed in the junction box 36, which has basically the same structure as the electricity manager 14 in the first embodiment, includes a microcomputer 37a and a memory 37b. Like in the first embodiment, the electricity manager 37 performs the electricity price calculation/output process to calculate the electricity cost based on the electricity cost (condition on the electricity supplying side), electricity consumption of the whole of the vehicle accessories detected based on the measurement result of the current sensor 13a (condition on the electricity consuming side), and the state (healthy or unhealthy) of the high voltage battery 33 (the condition on the electricity storage side), and transmits the calculated electricity price to the respective loads 21, 22, 23 and 24.

Like in the first embodiment, the memory 37b of the electricity manager 37 stores electricity price rate tables such as those shown in FIGS. 3A and 3B. Incidentally, in the case of an EV vehicle or a HV vehicle, the electricity cost (expensive, medium or inexpensive) may be determined based on a variation per unit time of electricity stored in the high voltage battery 33. For example, when the stored electricity is decreased significantly in a short period of time, since it means that a large amount of electricity has been consumed, the electricity cost increases. On the other hand, when electricity is generated using regenerative energy while the vehicle is decelerating, since the high voltage battery 33 is charged and the stored electricity increases gradually, the electricity cost decreases.

Figure 6:
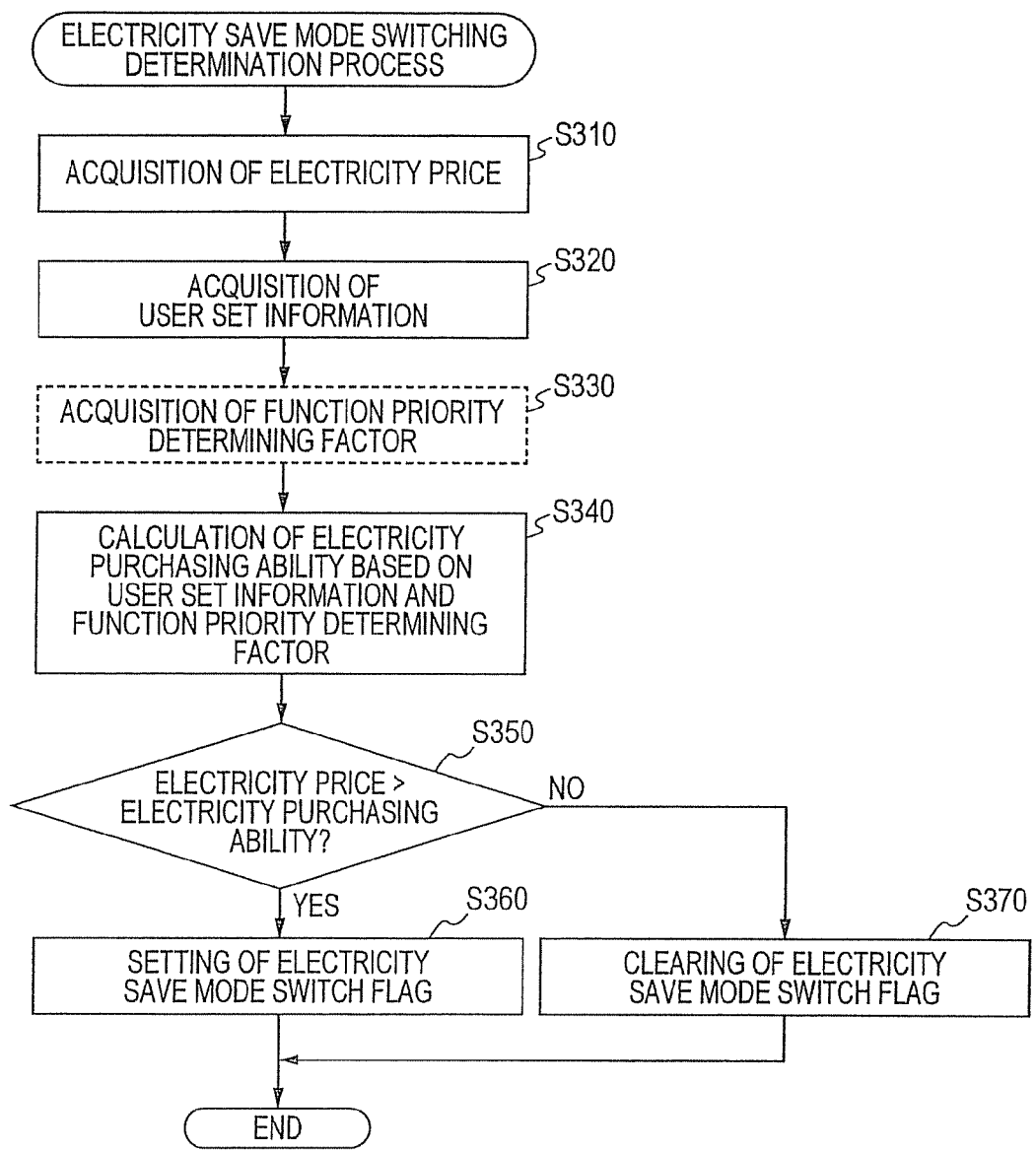
FIG. 6 is a flowchart showing an electricity save mode switching determination process performed by each electrical load.

The loads 21, 22, 23 and 24, which are the same in structure and operation as those described in the first embodiment perform the power save mode switching determination operation shown in FIG. 6.

Third Embodiment

Next, a third embodiment of the invention is described. The third embodiment uses an electricity price rate table different from the electricity price rate tables shown in FIGS. 3A and 3B. The electricity price rate table used in this embodiment is prepared to calculate appropriately the electricity price based on the electricity consumption of the loads 21, 22, 23 and 24 (that is, electricity consumption of the whole of the vehicle accessories), electricity cost (electricity generation cost), and remaining capacity (SOC) of the battery 12.

Incidentally, the electricity price rate tables shown in FIGS. 3A and 3B used in the first embodiment enable to calculate the electricity price taking into account, in addition to the conditions on the electricity consuming side and the electricity supplying side, the condition on the power storage side to some extent. For example, when both the SOH and SOC are low, the electricity price is calculated using the table shown in FIG. 3B assuming that the battery 12 is unhealthy. On the other hand, when both the SOH and SOC are high, the electricity price is calculated using the table shown in FIG. 3A assuming that the battery 12 is healthy.

In this embodiment, the electricity price is calculated taking into account the SOC of the battery 12 more sensitively.

Figure 8A:
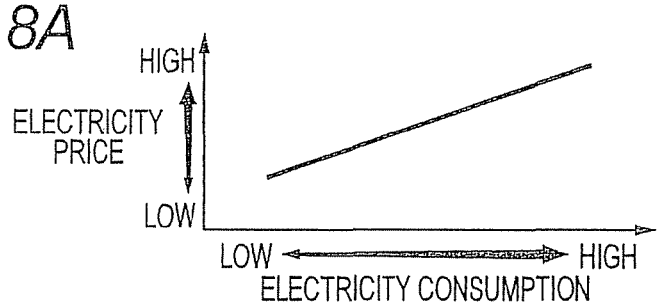
FIG. 8A is a diagram showing a relationship between an electricity consumption amount and an electricity price in an electricity management system according to a third embodiment of the invention.
Figure 8B:
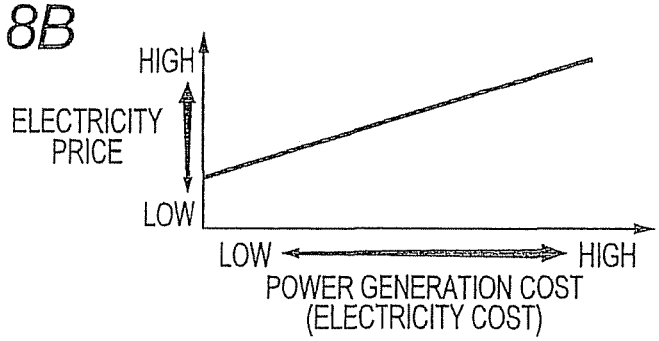
FIG. 8B is a diagram showing a relationship between an electricity generation cost and the electricity price in the electricity management system according to the third embodiment of the invention.
Figure 8C:
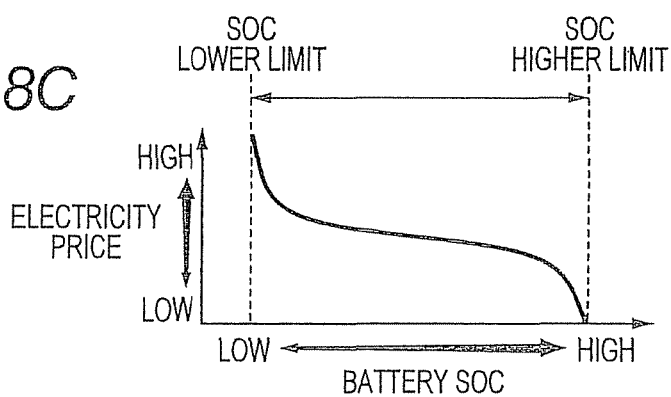
FIG. 8C is a diagram showing a relationship between a battery SOC and the electricity price in the electricity management system according to the third embodiment of the invention.

Here, the relationships among the electricity consumption of the whole of the vehicle accessories, electricity generation cost (electricity cost) and SOC of the battery 12 are re-explained. As shown in FIG. 8A, when the electricity cost and the SOC of the battery 12 are constant, the electricity price increases with the increase of the electricity consumption. As shown in FIG. 8B, when the electricity consumption and the SOC of the battery 12 are constant, the electricity price increases with the increase of the electricity cost. As shown in FIG. 8C, when the electricity consumption and the electricity cost are constant, the electricity price increases with the decrease of the SOC of the battery 12.

The electricity generation manager 17 controls such that the output voltage of the alternator 11 is kept at a predetermined voltage (12V, for example), and the SOC of the battery 12 is kept between lower and higher SOC limits as shown in FIG. 8C.

It should be understood that the characteristic curves shown in FIGS. 8A to 8C are just examples, and there are various possible different characteristics including linear, non-linear and discrete characteristics.

Figure 8D:
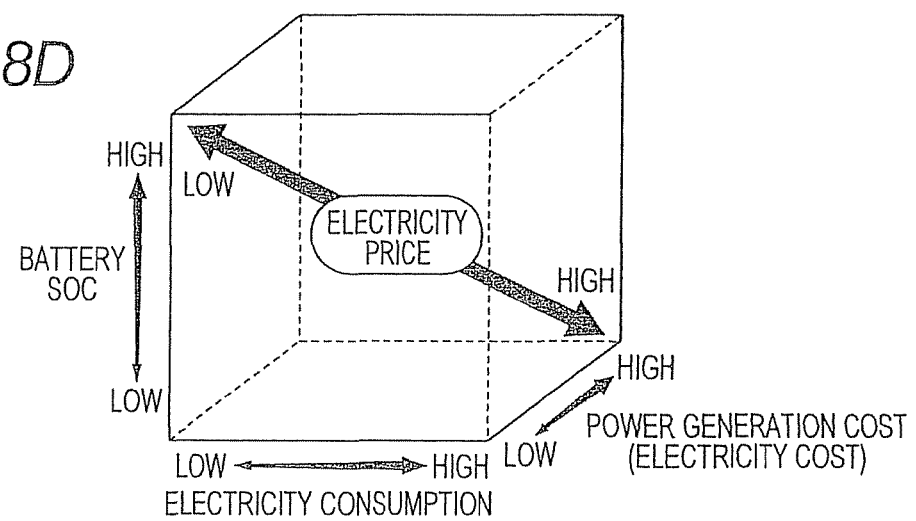
FIG. 8D is a diagram showing a relationship among the electricity generation cost, electricity consumption amount, a battery SOC and the electricity price in the electricity management system according to the third embodiment of the invention.

When the electricity consumption, electricity cost and SOC of the battery 12 are assigned with the same weight to calculate the electricity price, the relationship among them can be represented by a three-dimensional map shown in FIG. 8D. By preparing such a three-dimensional map in advance, the electricity price can be calculated easily based on the electricity consumption, electricity cost and SOC of the battery 12.

The above three-dimensional map can be implemented by using a function whose parameters are the electricity consumption, electricity cost and SOC of the battery 12. In this embodiment, the above three-dimensional map is implemented as an electricity price rate table shown in FIG. 9.

This electricity price rate table includes a unit rate table containing three different values of the electricity consumption amount (Low, Medium and High) and three different values of the electricity cost (inexpensive, medium and expensive) for each of five different levels of the SOC of the battery 12.

The five different levels of the SOC of the battery 12 includes "urgent" where the SOC is below a lower limit and it is difficult to drive even the accessory loads needed for the vehicle to run, "low" where the SOC is above the lower limit and below a predetermined value Sa, and it is not sufficient to drive all the accessory loads needed for the vehicle to run, "normal" where the SOC is above the predetermined value Sa and below a predetermined value Sb, and it is possible to drive at least the accessory loads needed for the vehicle to run, "good" where the SOC is above the predetermined value Sb, and it is possible to drive all the accessory loads, and "excessive" where the SOC is above a higher limit.

Figure 10:
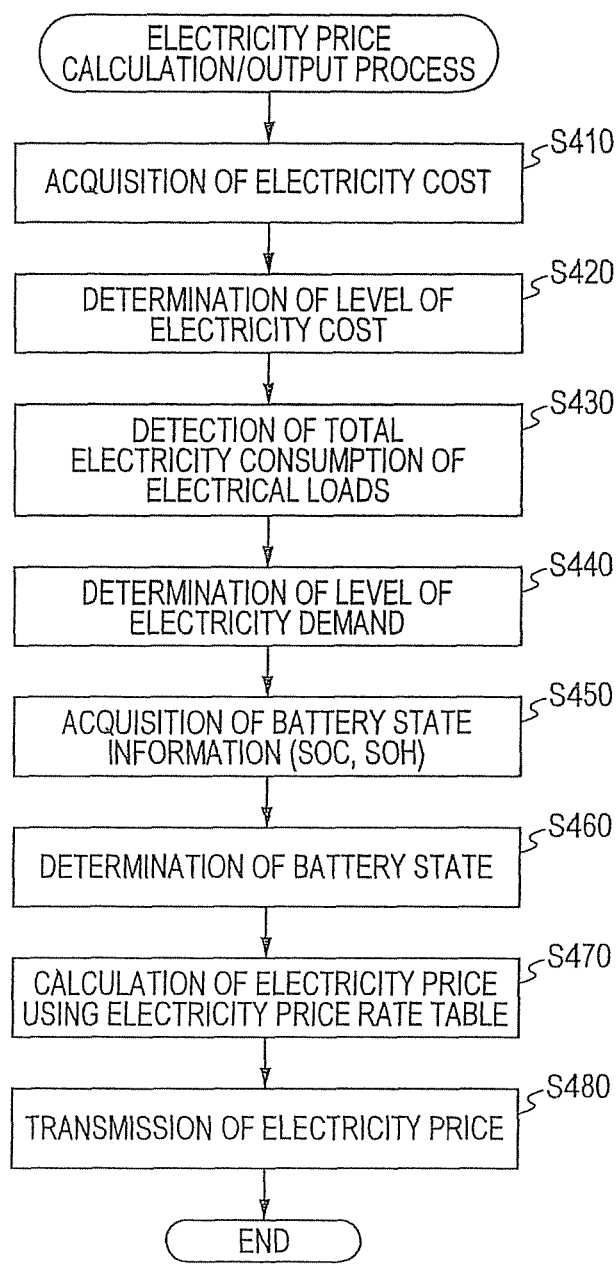
FIG. 10 is a flowchart showing an electricity price calculation/output process performed by the electricity manager included in the electricity management system according to the third embodiment of the invention.

As shown in FIG. 9, the five unit rate tables have a tendency that the electricity price decreases with the increase of the SOC. Next, an electricity price calculation/output process which the electricity manager 14 performs using the electricity price rate table shown in FIG. 9 is explained with reference to the flowchart of FIG. 10. Steps S410 to S440 of the flowchart shown in FIG. 10 are the same as steps S110 to S140 of the flowchart shown in FIG. 5 with reference to which the first embodiment is described. Through steps S410 to S440, acquisition of the electricity cost (electricity generation cost), determination of the level of the electricity cost (determination α), detection of the electricity consumption of the whole of the vehicle accessories, and determination of the level of the electricity consumption (determination β) are performed.

Thereafter, the SOC of the battery 12 transmitted from the electricity generation manager 17 is acquired in step S450. In subsequent step S460, the determination γ is made to determine at which of the levels "excessive", "good", "normal", "low" and "urgent" the SOC is.

In subsequent step S470, the electricity price is calculated based on the results of the determinations α, β and γ using the electricity price rate table shown in FIG. 9. The calculated electricity price is transmitted to the respective loads 21, 22, 23 and 24 in step S480.

By using the electricity price rate table shown in FIG. 9, it is possible to calculate the electricity price taking into account more appropriately the level of the electricity consumption, electricity cost and SOC of the battery 12. More specifically, the electricity price rate table shown in FIG. 9 contains more discrete values of the SOC of the battery 12 than the electricity price rate table shown in FIG. 3. Accordingly, according to this embodiment, it is possible to calculate the electricity price which reflects the SOC of the battery 12 more sensitivity than the first embodiment.

Incidentally, the levels (L, M and H) of the electricity price contained in the table shown in FIG. 9 are just examples. Also, classifying the SOC into five levels is just an example. It is possible to prepare an electricity price rate table (or map or function) to calculate the electricity price taking into account also the SOH in addition to the electricity consumption, electricity cost and SOC. The electricity price rate table as shown in FIG. 9 may be used in the second embodiment. In this case, the electricity price rate table is prepared based on the SOC of the high voltage battery 33.

Modifications

In the above embodiments, the electricity manager 17 is disposed in the junction box. However, the electricity manager 17 may be disposed in one of the other ECUs, for example, the engine ECU, or may be disposed in a dedicated ECU.

In the above embodiments, the electricity price is calculated using the electricity price rate table stored in the memory of the electricity manager. However, the electricity price may be calculated by any appropriate method that does not use such a table.

In the above embodiments, the electricity price is determined taking into account the condition on the electricity supplying side (power generation cost), the condition on the power consuming side (total electricity consumption) and the condition on the electricity storage side (state of the battery 12 or high voltage battery 33). However, the electricity price may be determined taking into account one or two of them.

In this case, it is preferable to calculate the electricity price based on a balancing between the condition on the electricity supplying side (power generation cost) and the condition on the power consuming side (total electricity consumption). In the first embodiment, a cost for generating electricity by the alternator 11 periodically calculated by the electricity generation manager 17 is used as the electricity cost representing the cost of electricity supplied to the respective loads. However, when the loads are supplied with electricity from both the alternator 11 and the battery 12 (that is, when the battery 12 is discharging), the electricity cost may be calculated taking into account not only the electricity generation cost but also a cost for storing electricity as described in the following. In the following description, the electricity generation cost is denoted by Cg, and the electricity storage cost is denoted by Cb.

When the loads are supplied with electricity from the alternator 11, and the battery 12 is charged by the alternator 11, the alternator 11 supplies all the electricity needed in the vehicle. In this case, the electricity generation cost Cg as is can be used as the electricity cost.

On the other hand, when the vehicle is running in the electricity save mode in which the alternator 11 is controlled to reduce generation of electricity to prevent reduction of fuel economy, the loads may be supplied with electricity from not only the alternator 11 but also the battery 12 when the vehicle is accelerating. Further, even when the vehicle is running in other than the power save mode, the loads may be supplied with electricity from both the alternator 11 and the battery 12 if the electricity demand of the loads is larger than the capacity of the alternator 11.

In such a state where the loads are supplied with electricity from both the alternator 11 and the battery 12 (that is, when the battery 12 is discharging), it is preferable to calculate the electricity price taking into account not only the electricity generation cost Cg but also the electricity storage cost Cb. The electricity storage cost Cb depends on the values of the electricity generation cost Cg of past time periods during each of which the battery 12 has been charged to reach the present SOC. The electricity storage cost Cb increases with the increase of the sum length of time periods during which the battery 12 has been charged under high values of the electricity generation cost Cg.

Figure 11:
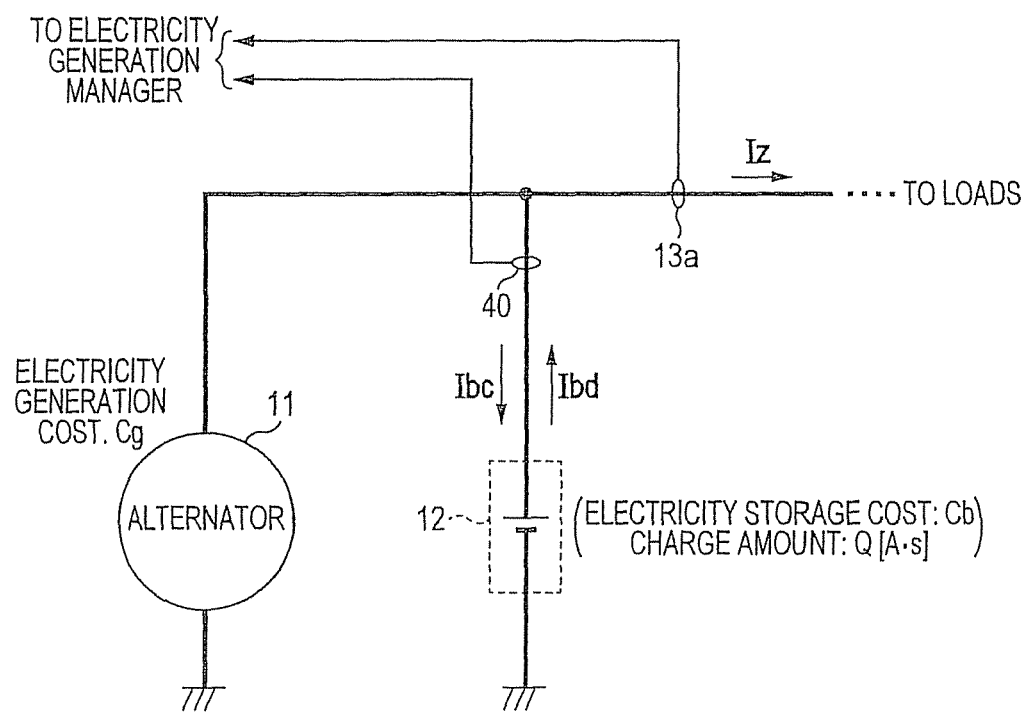
FIG. 11 is a diagram explaining another example of calculating an electricity cost.

In the following, an example of calculation of the electricity cost taking into account the electricity generation cost Cg and the electricity storage cost Cb is explained with reference to FIG. 11. FIG. 11 shows a part of the electricity management system shown in FIG. 1, which includes the alternator 11 and the battery 12. However, in this example, a battery current sensor 40 is additionally provided. Also in this example, the electricity generation manager 17 calculates the electricity cost, and the measurement results of the current sensors 13a and 40 are directly or indirectly inputted to the electricity generation manager 17.

As shown in FIG. 11, in this example, the current supplied to the whole of the loads (that is, the current measured by the current sensor 13a) is denoted by Iz [A], the charge current of the battery 12 is denoted by Ibc [A], the discharge current of the battery 12 is denoted by Ibd [A], and the charge amount stored in the battery 12 is denoted by Q [A·s].

When the battery 12 is being charged, that is, when the loads are supplied with electricity from alternator 11 and not from the battery 12, the electricity cost is set to the electricity generation cost Cg as shown in the following expression (1).

$$\text{Electricity cost} = Cg \quad (1)$$

Incidentally, it is possible to determine whether the battery 12 is being charged or discharged based on the measurement result (current direction, for example) of the battery current sensor 40.

During a period in which the battery 12 is charged, the power storage cost Cb is calculated based on the electricity generation cost Cg. To calculate the electricity storage cost Cb, for every s-second period while the battery 12 is charged, an amount of charge $Q_n$ charged in the battery 12 during this s-second period is calculated in accordance with the following expression (2).

$$Q_n = Q_{n-1} + Ibc \cdot s \quad (2)$$

In the expression (2), $Q_{n-1}$ is an amount of charge calculated at the time s seconds earlier than the time at which $Q_n$ is calculated. Accordingly, the charge amount of the battery 12 is updated at regular time intervals (every s seconds) while the battery 12 is charged. The initial value of $Q_n$ can be set in various ways. For example, it may be a predetermined default value, or may be estimated based on a variation of the SOC of the battery 12 when the battery 12 is first installed and the alternator 11 is caused to operate to charge the battery 12.

Further, while the battery 12 is charged, the electricity storage cost Cb is updated at regular time intervals (at the same timing of the update of the charge amount Q, for example) using the charge amount Q. In this embodiment, the update of the electricity storage cost Cb is performed in accordance with the following expression (3).

$$Cb_n = (Cb_{n-1} \cdot Q_{n-1} + Cg \cdot Ibc \cdot s)/(Q_{n-1} + Ibc \cdot s) \quad (3)$$

In the expression (3), $Cb_{n-1}$ is the electricity storage cost calculated at the time s seconds earlier than the time at which $Cb_n$ is calculated. Accordingly, the electricity storage cost Cb of the battery 12 is updated at regular time intervals (every s seconds). The initial value of the electricity storage cost Cb can be set in various ways.

The above expression (3) is based on the concept described in the following. Here, it is assumed that the battery 12 stores charge by an amount of $Q_{n-1}$ at a certain moment and the electricity generation cost at this moment is $Cb_{n-1}$, and that the battery 12 is charged with the current Ibc generated by the alternator 11 at the electricity generation cost Cg for a period of s seconds from this moment. In this case, the total amount of charge stored in the battery 12 increases from $Q_{n-1}$ by an amount of Ibc·s during this period of s seconds. Accordingly, the electricity storage cost Cb at the time s seconds after the above moment is changed from the electricity generation cost Cg at the above moment by a value depending on their values and the rate between the amount of charge stored in the battery 12 at the above moment and the amount of charge charged in the battery 12 during the s-second period.

As explained above, while the battery 12 is charged, the electricity cost is set to the electricity generation cost Cg, and the charge amount Q and the electricity storage cost Cb are updated at regular time intervals.

When the battery 12 is being discharged, that is, when the respective loads are supplied with electricity from both the alternator 11 and the battery 12, or from only the battery 12, the electricity cost is calculated in accordance with the following expression (4).

$$\text{Electricity cost} = \{(Iz-Ibd)\cdot Cg + Ibd\cdot Cb\}/Iz \qquad (4)$$

That is, in this case, the electricity cost is determined as a sum of the electricity generation cost Cg and the electricity storage cost Cb each of which is assigned with a weight depending on its contribution ratio to the total electricity supplied to the loads. For example, when the contribution ratio of the discharge current Ibd supplied from the battery 12 to the whole load current Iz supplied to the loads is 30%, and that of the current supplied from the alternator 11 is 70%, the electricity cost is calculated as $0.3\cdot Cb + 0.7\cdot Cg$.

Also while the battery 12 is being discharged, the charge amount Q is updated at regular time intervals (every s seconds, for example) in accordance with the following expression (5)

$$Q_n = Q_{n-1} - Ibd\cdot s \qquad (5)$$

By detecting whether the battery is being charged or discharged, and calculating the electricity cost taking into account not only the electricity generation cost Cg but also the electricity storage cost Cb when the battery 12 is detected to be being discharged as described above, it becomes possible to calculate the electricity cost more appropriately in accordance with whether the loads are supplied with electricity from only the alternator 11 or from also the battery 12.

In the above embodiments, each of the loads operates on electricity of DC 12 V. However, the present invention can be used for electrical loads which operate on electricity of other than DC 12 V (DC 42 V, for example), if a voltage converter to convert the output voltage of the alternator is provided. For example, to use the electricity management system of the invention for a HV vehicle or an EV vehicle on which an electrical load which operates on DC 42 V is mounted, a step-down converter to step down the output voltage of the high voltage battery 33 to DC 42 V and a step-up converter to step up DC 12 V outputted from DC/DC converter 35 to DC 42 V may be used.

Incidentally, vehicles having an electric motor as a traction power source such as HV vehicles or EV vehicles include ones provided with the so-called "plug-in function" to enable charging a high voltage battery using external electricity source. Especially, in the case of EV vehicles, the plug-in function is likely to be indispensable because they cannot generate electricity using an internal combustion engine. The present invention can be applied to also vehicles provided with the plug-in function. In this case, by setting the electricity cost very low while the high voltage battery is charged with electricity supplied from the external electricity source, it becomes possible for many electrical loads to consume electricity without concern of capacity of a vehicle battery. It is possible to set the electricity cost high while the high voltage battery is charged with electricity supplied from the external electricity source according to circumstances. Further, it is also possible to change the electricity cost depending on time of day when the external electricity source is a commercial electricity source the electricity rate of which differs between day and night.

The above explained preferred embodiments are exemplary of the invention of the present application which is described solely by the claims appended below. It should be understood that modifications of the preferred embodiments may be made as would occur to one of skill in the art.

What is claimed is:

1. A vehicle-use electricity management system for a vehicle, the vehicle-use electricity management system comprising:
a plurality of electrical loads and an electricity supply unit supplying electricity to the electrical loads;
an electricity demand detection unit detecting electricity consumed by the electrical loads as electricity demand;
an electricity price information generation unit generating electricity price information indicative of a price of electricity consumed by the electrical loads as an electricity price based on the electricity demand detected by the electricity demand detection unit;
wherein
at least one of the electrical loads includes an electricity consumption ability determination unit determining whether the electricity supplied from the electricity supply unit to the one electrical load can be consumed unconditionally based on a comparison between the electricity price information received from the electricity price information generation unit and electricity consumption ability information stored in the one electrical load, and an electricity consumption control unit controlling an amount of electricity consumed by the one electrical load based on a determination result made by the electricity consumption ability determination unit.

2. The vehicle-use electricity management system according to claim 1, wherein the electricity price generated by the electricity price information generation unit increases with an increase of the electricity demand.

3. The vehicle-use electricity management system according to claim 1, wherein the electricity supply unit includes an electricity generation section, an electricity output section to output electricity generated by the electricity generation section to the electrical loads as an operating voltage directly or through a voltage converter, and an electricity generation cost calculation unit calculating a cost of generating electricity by the electricity generation section as an electricity generation cost,
the electricity price information generation unit being configured to generate the electricity price information based on the electricity demand detected by the electricity demand detection unit and the electricity generation cost calculated by the electricity generation cost calculation unit.

4. The vehicle-use electricity management system according to claim 3, wherein the electricity price indicated by the electricity price information generated by the electricity price information generating unit increases with an increase of the electricity generation cost calculated by the electricity generation cost calculation unit.

5. The vehicle-use electricity management system according to claim 3, wherein the electricity generation cost calculation unit calculates the electricity generation cost based on a consumption of energy used to generate traction force of the vehicle.

6. The vehicle-use electricity management system according to claim 5, wherein the vehicle is configured to be able to run by traction force generated by an internal combustion engine mounted on the vehicle, the electricity generation section includes an electricity generating unit generating electricity by at least one of the traction force generated by the internal combustion engine and torque of an axle of the vehicle, and an electricity storage unit storing electricity generated by the electricity generating unit, the electricity output section is configured to output electricity generated by the electricity generating unit to the electrical loads as an operating voltage directly or through a voltage converter, and the electricity generation cost calculation unit calculates the electricity generation cost based on an amount of fuel consumed by the internal combustion engine as energy to generate traction force of the vehicle such that the electricity generation cost increases with an increase of the amount of fuel consumed by the internal combustion engine.

7. The vehicle-use electricity management system according to claim 6, wherein the electricity cost calculation unit includes an electricity generation cost calculation unit calculating a cost of generating electricity by the electricity generating unit, and an electricity storage cost calculation unit calculating an electricity storage cost indicative of a cost of electricity stored in the electricity storage unit, and is configured to calculate the electricity generation cost as a sum of the electricity generation cost weighted by a contribution ratio thereof to total electricity supplied to the electrical loads and the electricity storage cost weighted by a contribution ratio thereof to the total electricity supplied to the electrical loads.

8. The vehicle-use electricity management system according to claim 5, wherein the vehicle is configured to be able to run by traction force generated by an electrical motor mounted on the vehicle, the electricity generation section includes an electricity generating unit generating electricity from torque of an axle of the vehicle, and an electricity storage unit storing electricity as energy used to generate the traction force and electricity generated by the electricity generating unit, the electricity supply section is configured to supply electricity stored in the electricity storage unit to the electrical loads through a step-down converter, and the electricity generation cost calculation unit calculates the electricity generation cost based on a decrease per unit time of electricity stored in the electricity storage unit such that the electricity generation cost increases with decrease of electricity stored in the electricity storage unit.

9. The vehicle-use electricity management system according to claim 6, further comprising an electricity storage information acquisition unit acquiring electricity storage information indicative of at least one of a remaining capacity and an extent of deterioration of the electricity storage unit, the electricity price information generation unit generates the electricity price information based on the electricity demand detected by the electricity demand detection unit, the electricity generation cost calculated by the electricity generation cost calculation unit, and the electricity storage information acquired by the electricity storage information acquisition unit.

10. The vehicle-use electricity management system according to claim 9, wherein the electricity price information generation unit generates the electricity price information based on the electricity storage information such that the electricity price increases with a decrease of the remaining capacity of the electricity storage unit and with progress of deterioration of the electricity storage unit.

11. The vehicle-use electricity management system according to claim 1, wherein the electricity supply unit includes an electricity generation section having an electricity storage unit, an electricity output section to output electricity generated by the electricity generation section to the electrical loads as an operating voltage directly or through a voltage converter, and an electricity storage information acquisition unit acquiring electricity storage information indicative of a remaining capacity of the electricity storage unit, the electricity price information generating unit being configured to generate the electricity price information based on at least the electricity demand detected by the electricity demand detection unit and the electricity storage information acquired by the electricity storage information acquisition unit.

12. The vehicle-use electricity management system according to claim 11, wherein the electricity price shown by the electricity price information generated by the electricity price information generation unit increases with a decrease of the remaining capacity of the electricity storage unit indicated by the electricity storage information acquired by the electricity storage information acquisition unit.

13. The vehicle-use electricity management system according to claim 1, wherein the electricity consumption control unit operates to decrease electricity consumption of the one electrical load when the electricity consumption ability determination unit determines that the one electrical load cannot consume electricity supplied from the electricity supply unconditionally.

14. A vehicle-use electricity information management apparatus mounted on a vehicle having a plurality of electrical loads and an electricity supply unit managing electricity supplied from the electricity supply unit to the electrical loads, the vehicle-use electricity information management apparatus comprising:

an electricity price information generation unit generating electricity price information indicative of a price of electricity used by the electric loads and supplied from the electricity supply unit to the electrical loads based on an electricity demand of the electrical loads; and an output unit outputting the electricity price information generated by the electricity price information generating unit to at least one of the electrical loads.

15. The vehicle-use electricity information management apparatus according to claim 14, wherein the electricity supply unit includes an electricity generation section, an electricity output section to output electricity generated by the electricity generation section to the electrical loads directly or through a voltage converter, and the electricity price information generation unit generates the electricity price information based on the electricity demand, and electricity generation cost indicative of a cost of electricity generated by the electricity generation section.

16. The vehicle-use electricity information management apparatus according to claim 14, wherein the electricity supply unit includes a electricity generation section having an electricity storage unit, an electricity output section to supply electricity generated by the electricity generation section to the electrical loads directly or through a voltage converter, and the electricity price information generation unit generates the electricity price information based on at least the electricity demand, and a remaining capacity of the electricity storage unit.

17. A vehicle-use electrical load mounted on a vehicle and configured to operate on electricity supplied from an electricity supply unit mounted on the vehicle, the vehicle-use electrical load comprising:
- an electricity consumption determination unit determining whether the vehicle-use electrical load can consume electricity supplied form the electricity supply unit unconditionally based on a comparison between electricity price information received from the electricity supply unit and electricity consumption ability information set in the vehicle-use electrical load, the electricity price information indicating a price of electricity used by the electrical load and supplied from the electricity supply unit, the electricity consumption ability information indicating a level of ability to consume electricity supplied from the electricity supply unit; and
- an electricity consumption control unit controlling an amount of electricity consumed by the vehicle-use electrical load in accordance with a determination result by the electricity consumption determination unit.

\* \* \* \* \*